United States Patent

Dame

[15] 3,701,150
[45] Oct. 24, 1972

[54] RF TRANSMISSION AND DETECTION SYSTEM
[72] Inventor: John S. Dame, Oak Park, Ill.
[73] Assignee: Motorola Inc., Franklin Park, Ill.
[22] Filed: June 11, 1970
[21] Appl. No.: 45,293

[52] U.S. Cl. ............................. 343/6.5 SS, 343/6.8 R
[51] Int. Cl. ................................................. G01s 9/56
[58] Field of Search .......... 343/6.5 R, 6.5 LC, 6.5 SS, 343/6.8 R, 6.8 LC; 331/27

[56] References Cited

UNITED STATES PATENTS

| | | | |
|---|---|---|---|
| 3,573,649 | 4/1971 | West | 331/27 X |
| 3,095,564 | 6/1963 | Cartwright | 343/6.5 R X |
| 3,503,003 | 3/1970 | Grobert | 331/27 X |

Primary Examiner—T. H. Tubbesing
Attorney—Mueller & Aichele

[57] ABSTRACT

An interrogation station includes a master frequency oscillator controlled to perform as an FSK oscillator for the transmission of data from the interrogation station. In addition this oscillator provides an injection frequency for the mixer of an interrogation station receiver. In a transponder, an oscillator is locked to a multiple of the received interrogation station signal frequency and is used as the transponder transmitter oscillator for controlling the frequency of signals transmitted from the transponder to the interrogation station receiver.

13 Claims, 2 Drawing Figures

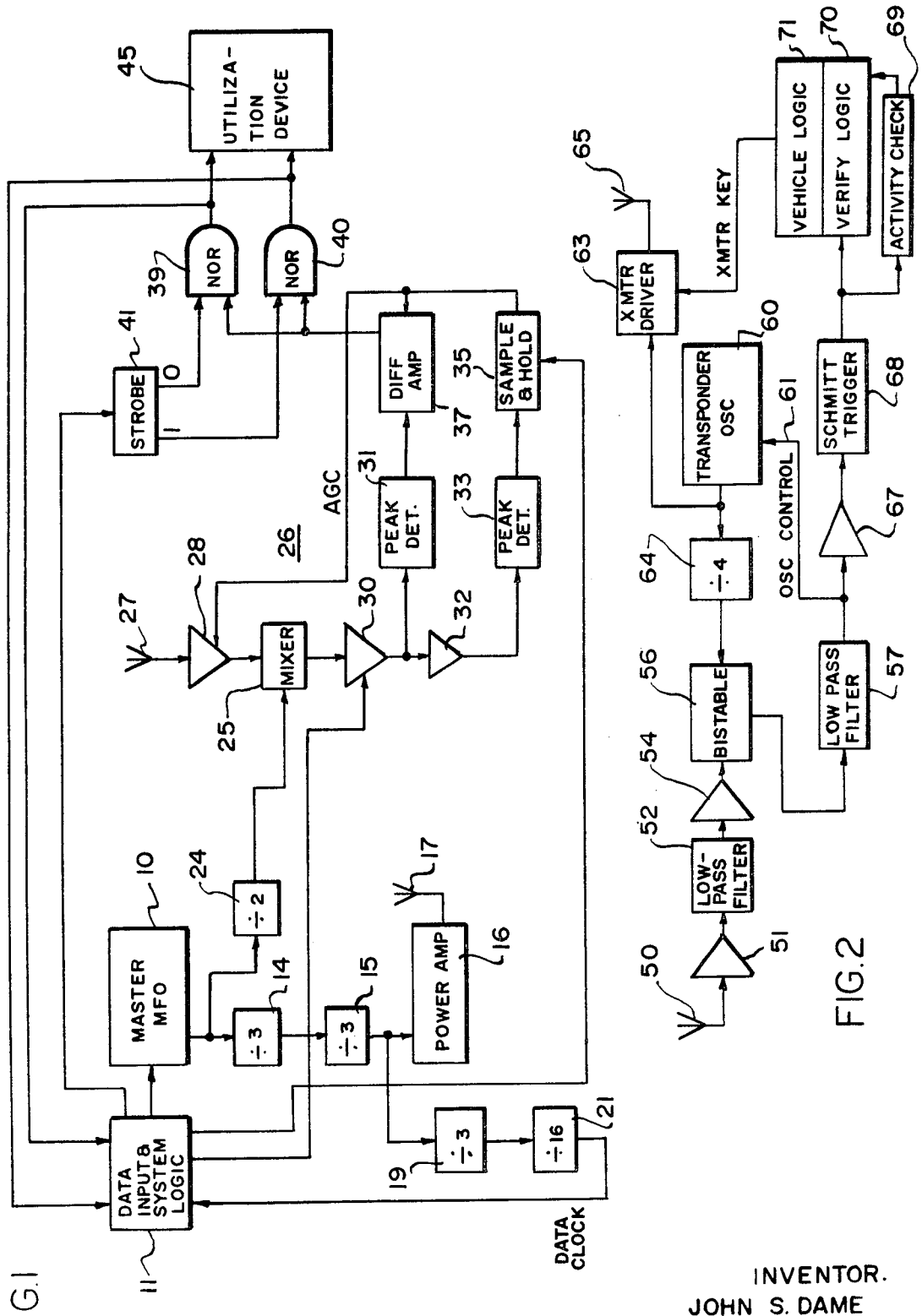
PATENTED OCT 24 1972  3,701,150
INVENTOR.
JOHN S. DAME
BY Mueller & Aichele
ATTORNEYS.

RF TRANSMISSION AND DETECTION SYSTEM

BACKGROUND OF THE INVENTION

It often is desirable to identify and monitor moving vehicles from a fixed location in order to determine the location of the moving vehicles at periodic intervals and also to determine variable information relating to particular conditions to be monitored in the vehicles. Several techniques have been developed for accomplishing these results, for example such as sending a coded message to the vehicle identifying the vehicle and requesting a response from it. The vehicle, upon receipt of its unique code then provides a reply to the monitor. Such a technique, however, generally requires that the vehicle have a relatively stable oscillator for controlling its transponder transmitter, with corresponding relatively close tolerances on the frequency requirements of the interrogation receiver and transmitting equipment. As a result, where large numbers of vehicles are involved, the cost of such a system can be prohibitive.

Systems involving a lower cost for the vehicle units have been proposed in which the use of color coding is employed for the identification and monitoring of vehicles, such as railroad freight cars, the number of which is high and which may be arranged in any random order in any particular train. In such systems, color signal patches are positioned on each of the freight cars which are to be monitored by a highly directive light beam positioned along side the track at an interrogation station. Although the color coded patches are relatively inexpensive and also provide means for identifying each of the cars without interference from one another, there are several drawbacks to such color coding systems.

For example, the directive light beam is reflected from other parts of the cars as they pass; so that the coding scheme used must be more complex then would be required if only the color patches were scanned by the light beam in order to distinguish the color coded signal from the background noise. In addition, fading of the code patches and extreme weather conditions, such as ice and snow, require that the code patches have sufficient redundancy to permit the message to read, even though parts of the code patch are missed or obscured. Even if such redundancy is provided, however, the patches may become temporarily obliterated or the track side unit may become blocked, rendering the system temporarily ineffective.

In the interests of operating simplicity and cost, it may be desirable to accept these limitations of color code patch systems for simple vehicle identification. The code patch systems, however, have other limitations which are unacceptable for some monitoring requirements. For example, with refrigerator freight cars which are to be monitored to determine whether or not the cars are operating properly and the temperature inside is within predetermined safe ranges, a more complex system than can be provided by this simple code patch is required, since simple code patch systems only provide fixed information such as car or vehicle identification.

The code patch method can provide variable information relating to the temperature of refrigerator cars and the like by placing the code patch on a revolving drum, with the particular code displayed indicating the information concerning the car which is to be monitored. Thus, as conditions within the car change, the drum rotates to change the code signal which is presented for interrogation by the track-side unit. Although a rotating drum system may be made to convey the desired information, the cost factors which dictate the use of the code patch when a simple identification interrogation is the only requirement make the use of the drum containing the code patch very much less attractive. This results from the increased cost of the mechanical apparatus which is required to position the drum. In addition, since the order and direction in which the cars are placed in a freight train is random and since the railroad cars or the piggy-back truck trailers can be positioned in either direction on the train, either two code patch drums are required, one on each side of the car, or at each interrogation location, interrogating or scanning units must be placed on both sides of the track. Even if a code patch drum system is employed, the problems of the sensitivity of this system to the position of the code patch and to weather are not overcome. Further the reliability of operation of the necessary mechanical apparatus in extreme weather conditions and under the extreme vibration to be found in the environment of the freight car is questionable.

As a consequence it is desirable to provide a radio transmission system requiring minimal sophistication in the transponder located in the freight car or piggy-back trailer, so that the advantages of radio transmission may be realized without the attendant prohibitive cost for the transponder units ordinarily associated with such systems.

SUMMARY OF THE INVENTION

Accordingly it is an object of this invention to provide an improved transponder system.

It is another object of this invention to reduce the cost of a radio frequency transponder system.

It is an additional object of this invention to control the operating frequency of a transponder in response to the frequency of a master frequency oscillator located in an interrogation station, with the master frequency oscillator also providing the injection frequency for the receiver of the interrogation station; so that the bandwidth requirements of the interrogation station receiver may be small since both the injection frequency and the received signal frequency from the transponder are controlled by the same master oscillator.

In accordance with a preferred embodiment of this invention, a transponder system responds to input signals encoded in the form of frequency shift keying (FSK) signals having at least two frequencies. In the transponder, a variable frequency oscillator provides the signals which control the frequency of operation of the output of the transponder, with the frequency of the oscillator being determined by a DC control voltage. A comparison circuit is supplied with the input signals and with the output of the variable frequency oscillator for providing a control voltage, the value of which is indicative of the frequencies of the two signals which are supplied thereto. This control voltage is supplied to the variable frequency oscillator to control its frequency of operation accordingly, and in addition the supply voltage is provided as the input to a threshold detection circuit the output of which varies in accordance with the variations in the control voltage applied thereto to decode the input signals received by the transponder.

In a more specific embodiment, the transponder is part of a radio frequency transmission and detection system also including an interrogation station for supplying the FSK signals to the transponder. The interrogation station includes a master frequency oscillator which controls the frequency of the transmitted FSK signals, and an injection frequency for the interrogation station receiver also is derived from the output of this master frequency oscillator. The receiver at the interrogation station responds to the signals transmitted from the transponder to provide an output indicative of these signals; and since the injection frequency and the transponder oscillator frequency both are derived from the same master frequency oscillator in the interrogation station, the bandwidth requirements of the interrogation receiver are narrow, without requiring a highly stable crystal controlled oscillator or the like in the transponder circuit.

BRIEF DESCRIPTION OF THE DRAWING

FIG. 1 is a block diagram of an interrogation station in accordance with a preferred embodiment of this invention; and FIG. 2 is a block diagram of a transponder for operation with the interrogation station of FIG. 1.

DETAILED DESCRIPTION

Referring now to the drawing, there is shown in FIG. 1 an interrogation station of a type which may be provided at fixed locations passed by vehicles to be interrogated. In conjunction with a railway system, the interrogation station could be located along the right-of-way of the trains including cars which are to be monitored. Each of the vehicles to be monitored by the interrogation station shown in FIG. 1 carries a transponder of the type illustrated in FIG. 2.

In the interrogation station, a master frequency oscillator 10 is utilized to provide all of the operating frequencies for the system, including the vehicle transponder illustrated in FIG. 2.

The master frequency oscillator 10 is controlled by data input signals from a data input and system logic circuit 11 which supplies a sequence of two level or binary signals to the master frequency oscillator 10. These signals cause the frequency of the oscillator 10 to shift between two frequencies, so that its output is an FSK output signal. This output is supplied through two divide-by-three circuits 14 and 15 to a power amplifier circuit 16, which supplies the output signals from the interrogation station over a transmitting antenna 17. For the purposes of illustration, the transmitter frequencies supplied from the antenna 17 may be considered 47 kilohertz for mark or binary "1" information, and 43 kilohertz for space or binary "0" information.

The output of the frequency divider 15 also is supplied through another divide-by-three frequency divider 19 and a divide-by-sixteen frequency divider 21 to provide data clock signals to the data input and system logic for operating that logic. Thus, the data input and system logic frequency is controlled directly by the master frequency oscillator 10. The ratio of the frequency at the output of the frequency divider 21, which supplies the data clock signals to the data system 11, to the master oscillator frequency is constant, even though the frequency of the master frequency oscillator 10 is varied between the two frequencies mentioned above In addition to supplying the FSK signals which are transmitted from the interrogation station, the output of the master frequency oscillator 10 is also supplied through a divide-by-two frequency divider 24 which supplies the injection frequencies to a mixer 25 located in the interrogation station receiver circuit 26. Signals received by the receiver circuit 26 are applied from a receiver antenna 27 to a band pass amplifier 28. The output of the mixer 25 then is supplied through a tuned amplifying circuit 30 to a first peak detector 31, with the output of the amplifier 30 also being supplied to a further amplifier 32 which provides input signals to a second peak detector 33.

The input signals which are supplied to the antenna 27 and which ultimately determine the magnitude of the signals stored in the peak detectors 31 and 33 are supplied to the antenna 27 from the transponder shown in FIG. 2. The interrogation station shown in FIG. 1 may continuously transmit interrogation code sequences in the form of two level FSK signals in accordance with a predetermined pattern generated by the date input and system logic 11. The particular format of this pattern may vary to suit the particular operating requirements of the system employing the interrogation station and transponder shown in FIGS. 1 and 2. Since a large number of different interrogation formats may be utilized and generated in known manners, no details of the circuits used to form a generate the interrogation sequence have been illustrated.

The signals transmitted from the antenna 17 are received in the transponder on an antenna 50 when the vehicle carrying the transponder comes close enough to the interrogation station to receive such signals. These signals are supplied through an RF amplifier stage 51 to a low-pass filter 52 which has a pass characteristic chosen to prevent signals transmitted by the transponder circuit and received by the antenna 50 from being passed thereby. The output of the filter 52 is applied through an additional amplifier stage 54 to the "set" input of a bistable multivibrator 56, so that a "-set" pulse is applied to the input of the multivibrator 56 for each cycle of the received FSK input signals.

Included in the transponder is a variable frequency transponder oscillator 60, the frequency of which is controlled by a DC control voltage applied over a lead 61 to the oscillator 60, with the output frequency of the oscillator 60 selected to be four times the frequency transmitted by the interrogation station. The output of the transponder oscillator 60 is applied to a transmitter driver circuit 63 to provide the source of operating frequency for the transmitter of the transponder. This output also is applied through a divide-by-four frequency divider 64 which supplies output signals or pulses to the "reset" input of the bistable multivibrator 56, thereby resetting the multivibrator 56 each time that a reset pulse is applied thereto following the application of a set pulse to the "set" input from the output of the amplifier 54.

In order to derive the oscillator control voltage for the transponder oscillator 60 to phase lock the frequency of operation of the transponder oscillator 60 to the frequency of the received signal obtained from the antenna 50, the output of the multivibrator 56 is applied through a low pass filter 57 to produce a varying DC control level, the magnitude of which is dependent upon the frequencies of the input signals applied to the "set" and "reset" inputs from the amplifier 54 and the frequency divider 64, respectively.

The output of the low pass filter 57 rapidly changes to a different DC level when the input frequency received on the antenna 50 changes in accordance with the FSK signal being transmitted from the interrogation station antenna 17. This change in DC level is applied over the oscillator control lead 61 to the oscillator 60 to shift the frequency of the transponder oscillator 60 until the frequency of the oscillator 60 is four times the received input frequency. When this condition is reached, the DC output of the low pass filter 57 stabilizes at the particular level established by the transmitted frequency from the interrogation station.

This changing DC level from the low pass filter 57 also is applied through an amplifier 67 to a Schmitt trigger circuit 68, the output of which is a reconstructed two level or binary signal, corresponding to the input signals applied to the master frequency oscillator 10 from the data input system logic 11 in the interrogation station. This reconstructed signal train from the output of the Schmitt trigger circuit 68 may be utilized in a number of different manners in the transponder circuit according to the manner in which the transponder is selected to operate and interelate with the interrogation station shown in FIG. 1.

In a typical transponder, which is illustrated in FIG. 2, the output of the Schmitt trigger circuit 68 may be applied to an activity circuit 69 of a conventional type which provides an output upon receipt of received signal activity as evidenced by the output of the Schmitt trigger 68 over a predetermined period of time. This activity circuit output then may be utilized to control the application of operating power to a verify logic circuit 70 and a vehicle logic circuit 71. Either the activity circuit 69 or the verify circuit 70 may include suitable decoding logic or some other criterion for recognizing the vehicle address (which may be simple or complex) to initiate operation of the vehicle logic 71, which supplies the keying signals to the transmitter driver 63 to key the driver on and off in order to supply bursts of signals in accordance with the key sequence. The signal bursts are at the frequency determined by the output frequency of the transponder oscillator 60. These transmitted signals are applied over an output antenna 65 and are received on the interrogation station receiver antenna 27.

The bandpass characteristics of the amplifier 28 in the interrogation station are such as to pass the signals supplied to the antenna 27 from a transponder unit and to block the signals transmitted from the interrogation station antenna 17. Since the signals transmitted from the transponder are phase-locked to the frequency of the master frequency oscillator 10 and since the injection frequency applied to the mixer 25 also is obtained from the oscillator 10, the bandwidth requirements for the interrogation receiver can be quite narrow.

One manner in which the interrogation and transponder function can be realized is for the interrogation station to continually transmit a sequence of FSK interrogation pulses of a unique pattern. When this pattern is detected by the activity check circuit 69 and the verify logic 70 in the vehicle and upon counting a predetermined number of interrogation pulses, vehicle logic 71 is energized to control the transmission of the unique data corresponding to the information to be supplied from the transponder in the vehicle to the interrogation station.

In the system shown in FIGS. 1 and 2, the "mark" and "space" data supplied by the interrogation station to the transponder is reconstructed at the output of the Schmitt trigger circuit 68 in the form of a two level varying DC signal. Binary information in the form of "mark" and "space" or "1" and "0" pulse sequences then can be transmitted from the vehicle logic 71 under the control of verify logic 70. One form which this transmission may take is by keying the transmitter driver 63 on during receipt of a "space" from the interrogation station when the next pulse to be transmitted by the vehicle logic 71 is to be a "mark" or "1". Similarily, when a binary "0" or "space" is to be transmitted by the vehicle logic 71, in accordance with the pulse sequence stored in a permanent or temporary storage circuit therein, the "space" information can be provided by keying on the transmitter driver 63 during a predetermined portion of the next subsequent received "mark" from the interrogation circuit as determined by the output of the Schmitt trigger circuit 68. By controlling the transmitter key of the transponder in this manner, it is possible to provide a verification of the transponder message as received by the interrogation station by causing the signal sequence transmitted by the interrogation station to be in the form of verification pulse sequences uniquely verifying whether a binary "1" or a binary "0" pulse was received by the receiver 26 in the interrogation station.

Although a relatively narrow bandwidth circuit may be employed in the receiver 26 since the injection and input frequencies vary together, the output frequency of the mixer 25 will not be the same when the transmitter driver 63 is opened for transmission during the reception of a "mark" by the transponder as when the transmitter driver 63 is opened for transmission from the transponder during the reception of a space FSK signal; but the two frequencies are approximately only 750 cycles different at the output of the mixer 25 for the two FSK frequencies described previously. This difference permits the bandwidth of the receiver 26 to be quite narrow.

In view of the fact that the signals transmitted from the transponder antenna 65 are in the form of bursts of transmitted frequency followed by an off or no transmission condition of the transponder unit, it is desirable to compare the signal level of the signals received by the receiver unit 26 during the transmission of the bursts of signals from the transponder with a signal level which exists in the presence of noise and in the absence of signals being transmitted by the transponder circuit. To accomplish this, the output of the mixer circuit 25 is applied through two amplifier circuits 30 and 32 with the output of the amplifier circuit being applied to the peak detector 31, as described previously, and with the output of the amplifier 32 being applied to a peak detector 33, which in turn provides an output signal to a sample and hold circuit which may be of any suitable configuration. At predetermined time intervals, established from knowledge of the signal pattern, a pulse is applied from the output of the data input and system logic circuit 11 to the sample and hold circuit 35 to cause it to be gated to store the signal level present at the output of the peak detector 33 at that time. The timing of this gating pulse may be established in conjunction with the timing provided by the data clock to the data input and system logic 11 to occur at a time in the signal format when the output of the transponder is known to be off between transmission of bursts of signals from the transponder. The output of the sample and hold circuit 35 then establishes a DC reference level for a differential amplifier comparison circuit 37 and is applied to the reference input of the differential amplifier 37. This output also may be used as an AGC signal to control the gain of the input amplifier 28.

When a signal is transmitted by the antenna 65 of the transponder and is received by the receiver 26, the signal level thereof is applied by the peak detector 31 to the differential amplifier circuit 37 where it is compared with the reference level provided by the circuit 35. If a signal burst is present, the output of the differential amplifier changes from a normally high output to a low output to enable a pair of NOR gates 39 and 40 which are utilized to decode the "0" and "1" received information, respectively.

To generate a typical verification pattern, the signal transitions in the date input and system logic signal applied to the input of the master frequency oscillator 10 to shift the frequency thereof are detected in a strobe circuit 41, with the signal transition signifying the beginning of a transmitted mark interval being delayed a predetermined length of time and applied to the "0" output of the strobe circuit 41 in the form of a negative-going pulse. This pulse applied to the NOR gate 39 produces a positive-going output, signifying a received "0" if the NOR gate 39 is enabled by the output of the differential amplifier 37 at the time the "0" strobe occurs. As stated previously, a "0" pulse transmitted from the transponder always is transmitted during the beginning of the transmission of a "mark" pulse from the interrogation station; so that strobing the gate 39 at this time provides an indication as to whether or not a space is being transmitted by the transponder.

The strobe circuit 41 also provides a delayed "1" strobe pulse in response to a signal transition applied to the input of the master frequency oscillator 10 signifying a mark-to-space transition in the interrogation station transmitted signal. The NOR gate 40 then is strobed in the same manner as the NOR gate 39 but during the transmission of "space" from the interrogation station. If a "1" is being received at the same time (since transponder "1's" are transmitted during a received space in the transponder), the output of the NOR gate 40 will be a positive pulse upon the application of the strobe "1" pulse from the circuit 41.

The received pulse sequence, as determined by the outputs of the NOR gates 39 and 40, may be supplied to a suitable utilization device 45, such as a printer, cathode ray tube display, or the like. The same signals obtained from the outputs of the NOR gates 39 and 40 are applied to the data input system logic 11 to control the transmitted pattern of the frequency shifts of the frequency of the master oscillator 10. This pattern may be a unique sequence of "mark" and "space" pulses verifying that either a "1" or a "0" pulse was received by the interrogation station. The format of the transmitted pulse, as received by the transponder, then is supplied from the Schmitt trigger circuit 68 to the verify logic 70, where it is compared with the data transmitted from the transponder to determine agreement or disagreement therewith. If the verification is in disagreement, transmission from the transponder may be interrupted and the interrogation station may be caused to resume the interrogation sequence. The particular signalling sequence which has been described is provided merely for purposes of illustration, since the operation of the system with respect to the manner in which the frequency of operation of the transponder oscillator 60 and the injection frequency of the mixer circuit 25 in the interrogation station receiver 26 are controlled by the master frequency oscillator 10 is not dependent upon any particular code format in the system. The verification code sequence which has been described is not necessary to an operation of the system which locks all of the frequencies to a single source located in the interrogation station. A relatively inexpensive oscillator may be employed for the oscillator 60 in the transponder since it is not necessary to employ a crystal oscillator or other highly stable oscillator in the transponder circuit. This permits a substantial reduction in cost of the transponder. At the same time, since the injection frequency and the received frequency applied to the receiver circuit 26 booth are derived from the same source, it is possible to utilize a narrow bandwidth circuit in the receiver 26 of the interrogation station.

In order to optimize the operation of the peak detector circuits 31 and 33, it is desirable to dump or return these circuits to a predetermined level at periodic time intervals not important to the decoding of the information received from the transponder unit. Such time intervals in a binary or two level transmission system may readily be ascertained with knowledge of the pulse sequences being utilized, so that the application of a properly timed dump signal from the system logic 11 to the amplifier 30 causes the peak detectors 31 and 33 to be returned to a reference level each time a dump signal is provided. The reference signal applied to the differential amplifier 37 and the signal input obtained from the outputs of the peak detector 31 then are reestablished prior to each decoding sequence, thereby improving the accuracy of the decoded information obtained from the output of the NOR gates 39 and 40.

I claim

1. A transponder system responsive to input signals encoded in the form of FSK signals having at least two frequencies including in combination:

a variable frequency oscillator providing signals controlling the frequency of operation of the output of said transponder system, the frequency of the oscillator being determined by a DC control voltage;

comparison means responsive to the input signals and to the output of the oscillator for providing a control voltage, the value of which is a function of the relative frequencies of the input signals applied thereto;

means for applying the control voltage to the oscillator to control the frequency of operation thereof accordingly; and threshold means responsive to the control voltage over a predetermined value to provide one output and for providing a different output for the control voltage below said predetermined value to decode said input signals.

2. The combination according to claim 1 further including means for modulating the oscillator output to provide output signals from said transponder.

3. The combination according to claim 2 further including a transmitter driver responsive to the output of the oscillator for supplying signals to an antenna and wherein the modulating means operates to key the output of the transmitter driver on and off in accordance with a signal train to be transmitted, the transmitted frequency being controlled by the frequency of the oscillator.

4. The combination according to claim 1 wherein the comparison means includes a bistable multivibrator and a low pass filter, the output of the multivibrator being supplied to the input of the low pass filter, the output of which is the control voltage, the bistable multivibrator having set and re-set inputs, with the input signals being applied to one of said inputs and with the output of the variable frequency oscillator being supplied to the other of said inputs.

5. The combination according to claim 4 wherein the threshold means includes a threshold trigger circuit providing a first output in response to the control voltage over said predetermined value and providing a second output in response to the control voltage below said predetermined value.

6. The combination according to claim 5 wherein the trigger circuit is a Schmitt trigger circuit.

7. A radio frequency transmission and detection system having an interrogation station for supplying interrogation station signals and a transponder for receiving the interrogation station signals and transmitting reply signals to the interrogation station, including in combination:

a master frequency oscillator at the interrogation station for controlling the frequency of the interrogation station signals;

an interrogation station receiver having a mixer supplied with an injection signal obtained from the master frequency oscillator;

a transponder oscillator in the transponder;

means in said transponder responsive to received signals from the interrogation station for varying the frequency of the transponder oscillator in accordance with the frequency of the received interrogation station signals;

transmitter means in the transponder controlled by the output of the transponder oscillator for transmitting signals to the interrogation station receiver; and means in the interrogation station for supplying received signals from the transponder transmitter means to the mixer, the bandwidth requirements of the interrogation station receiver being narrow, since both the injection and received signals supplied to the mixer thereof are directly related to the same master frequency oscillator.

8. The combination according to claim 7 further including means for varying the frequency of the master frequency oscillator so that the interrogation station signals are in the form of FSK signals.

9. The combination according to claim 8 wherein the transponder oscillator is a variable frequency oscillator, the frequency of which is determined by a DC control voltage applied thereto;

and the means in said transponder responsive to signals received from the interrogation station for varying the frequency of the transponder oscillator also is responsive to the transponder oscillator output signals for providing a control voltage which is a function of the relative frequencies of said two signals and includes means for applying said control voltage to the transponder oscillator to control the frequency thereof accordingly.

10. The combination according to claim 9 further including threshold means responsive to said control voltage over a predetermined value for providing one output and responsive to said control voltage below said predetermined value for providing a different output.

11. The combination according to claim 10 further including means for keying the output of the transponder transmitter means in accordance with signals to be transmitted therefrom.

12. The combination according to claim 10 wherein the means for providing the control voltage includes a low pass filter and a bistable multivibrator having at least one output and first and second inputs, with the multivibrator output being coupled to the low pass filter, the output of which is said control voltage, with the first multivibrator input being supplied with input signals received from the interrogation station and with the second multivibrator input being supplied with the output of the transponder oscillator, signals applied to the first multivibrator input causing the multivibrator to assume a first state of operation and signals applied to the second multivibrator to assume a second state of operation.

13. The combination according to claim 12 wherein the threshold means includes a threshold trigger circuit responsive to the output of the filter to produce an output signal train which corresponds to the signal train supplied by the interrogation station.

* * * * *